United States Patent
Lorach

(10) Patent No.: US 9,875,568 B2
(45) Date of Patent: Jan. 23, 2018

(54) GRAPHICS EFFECT DATA STRUCTURE AND METHOD OF USE THEREOF

(71) Applicant: Nvidia Corporation, Santa Clara, CA (US)

(72) Inventor: Tristan Lorach, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 160 days.

(21) Appl. No.: 13/911,650

(22) Filed: Jun. 6, 2013

(65) Prior Publication Data

US 2014/0362093 A1 Dec. 11, 2014

(51) Int. Cl.
*G06T 1/20* (2006.01)
*G06T 15/00* (2011.01)

(52) U.S. Cl.
CPC .................. *G06T 15/005* (2013.01)

(58) Field of Classification Search
None
See application file for complete search history.

(56) References Cited

U.S. PATENT DOCUMENTS

| | | | |
|---|---|---|---|
| 7,839,410 B1* | 11/2010 | Brown et al. | 345/541 |
| 2003/0179220 A1* | 9/2003 | Dietrich, Jr. | G06F 8/30 345/679 |
| 2009/0225079 A1* | 9/2009 | Schechter | G06T 15/005 345/426 |
| 2010/0214301 A1* | 8/2010 | Li | G06T 1/20 345/522 |

OTHER PUBLICATIONS

Rost, "OpenGL Shading Language, Second Edition," Jan. 2006, Addison Wesley Professional, Second Edition.*

* cited by examiner

*Primary Examiner* — Andrew G Yang
(74) *Attorney, Agent, or Firm* — Kevin Brown; Parker Justiss, P.C.

(57) ABSTRACT

A graphics effect data structure and method of use thereof. One embodiment of the graphics effect data structure is embodied in an effect processing system, including: (1) a memory configured to store an effect data structure that describes a graphics effect implemented by a plurality of passes and shader code modules contained in the effect data structure, (2) a graphics processing unit (GPU) operable to render the graphics effect according to a shader program based on the shader code modules, assembled according to the plurality of passes, and (3) a central processing unit (CPU) configured to execute an application that employs the graphics effect and to gain access to the effect data structure during run time, at which time the shader program is passed to the GPU for processing.

20 Claims, 3 Drawing Sheets

GRAPHICS EFFECT DATA STRUCTURE AND METHOD OF USE THEREOF

TECHNICAL FIELD

This application is directed, in general, to computer graphics and, more specifically, to data structures for defining graphics effects and the use thereof.

BACKGROUND

Many computer graphic images are created by mathematically modeling the interaction of light with a three dimensional scene from a given viewpoint. This process, called "rendering," generates a two-dimensional image of the scene from the given viewpoint, and is analogous to taking a photograph of a real-world scene. Rendering is typically a series of pipelined operations whereby two- or three-dimensional points in space are computed and projected into a two-dimensional space corresponding to the given viewpoint. Those points are assembled to form geometric primitives, which are rendered pixel-by-pixel.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Those primitives are rendered pixel-by-pixel. Each vertex may have additional scalar or vector attributes used to determine qualities such as the color, transparency, lighting, shading, and animation of the vertex and its associated geometric primitives. Each pixel is subject to calculations to arrive at appropriate attribute values. The most common example is lighting computations for each pixel.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs" or "programmable shaders."

SUMMARY

One aspect provides an effect processing system. In one embodiment, the system includes: (1) a memory configured to store an effect data structure that describes a graphics effect implemented in a shader portion of the effect data structure, (2) a GPU operable to render the graphics effect according to the shader portion, and (3) a CPU configured to execute an application that employs the graphics effect and to gain access to the effect data structure during run time, at which time the shader portion is passed to the GPU for processing.

Another aspect provides a method of generating a shader program. In one embodiment, the method includes: (1) loading a graphics effect from an effect data structure stored in memory, (2) parsing the effect data structure, (3) creating a runtime effect object encapsulating a plurality of passes based on parsed data from the parsing, and (4) employing a graphics application programming interface (API) in compiling shader code modules of the effect data structure according to the runtime effect object, thereby generating the shader program.

Yet another aspect provides a method of rendering a graphics effect on an object in a scene. In one embodiment, the method includes: (1) executing an application that calls for the graphics effect to be rendered, (2) parsing an effect file containing an effect data structure that describes the graphics effect, the effect data structure containing a pass, parameters and shader code modules for implementing the graphics effect, (3) creating a runtime effect object encapsulating the effect data structure, (4) employing a graphics API to compile the shader code modules according to the pass, thereby generating a shader program, and (5) executing the shader program by invoking the pass through the runtime effect object, thereby rendering the graphics effect.

BRIEF DESCRIPTION

Reference is now made to the following descriptions taken in conjunction with the accompanying drawings, in which.

DETAILED DESCRIPTION

Figure 1:
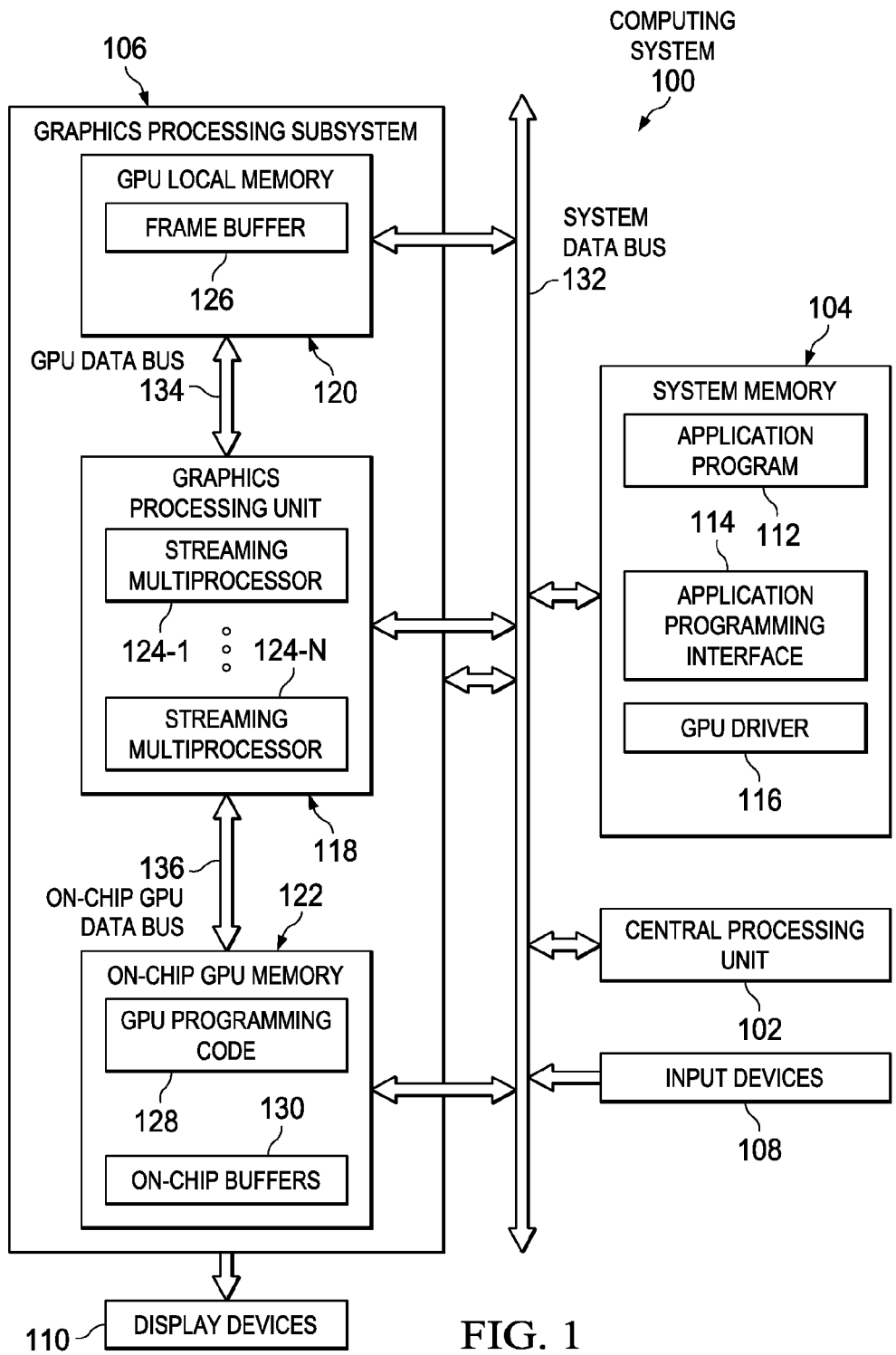
FIG. 1 is a block diagram of one embodiment of a computing system.

Much of what the GPU processes is implemented in a shading language, or a specialized programming language adapted for characterizing surfaces, volumes and objects. Examples of shader languages include: compute unified device architecture (CUDA), OpenGL shading language (GLSL), GLSL for embedded systems (GLSL-ES), GLSL-Compute, high-level shading language (HLSL), and SVG/PostScript for vector graphic. Shading languages are used to write shader code modules, or "shaders." A shader is a body of code that implements a basic shading procedure. An effect is a high-level mechanism for managing various shaders, parameter access, samplers, sampler states for graphics APIs, techniques and passes. The effect also manages resources, such as textures, off-screen render targets, temporary shared memory and buffers of parameters. The effect, often thought of as a container, packages these elements for use in various APIs, such as OpenGL, CUDA and DirectX to drive the GPU, and, in certain embodiments, to drive the CPU. The effect should generally be independent of other portions of code in the application. This compartmentalization allows for simplified application code that is maintainable and efficient, although effects themselves can be larger bodies of code.

An effect is essentially a self-contained abstraction of shading implementations. Critical input/output (I/O) information and resource information necessary for execution can be stored in an effect, relieving the main application of I/O management and resource creation. Rather than complicate the main application, effects are used to encapsulate shading functionality, which greatly simplifies the main application.

A typical effect declares parameters, defines render-states and sampler-states, defines resources and implements shading or "compute" functionality. The effect also provides a set of "passes" for entering a specific configuration of render-states and sampler-states. Multiple passes can be put together to form a technique. An effect can contain one or more techniques, each containing one or more passes. The effect is parsed or compiled along with the main application. Typically, a front-end parser reads the file and invokes API functions to build the effect database in memory. At runtime, the CPU executes the main application and generates rendering commands to be carried out by the GPU. More specifically, the main application executes the passes from the effect, thereby setting up various shaders, render-states and binding of I/O resources.

Existing effect frameworks are either no longer supported or are limited application due to their proprietary nature or association with certain APIs or hardware. It is realized herein the effect container can be decoupled from the shader language. Such an effect container would support many shading languages, including GLSL, GLSL-Compute, HLSL, CUDA and others. Rather than incorporating the shader code into the effect code, the shader code is held in the effect code as a piece of data, which is not parsed nor compiled by the effect runtime. The shader code passes from the effect container to the GPU via an API or driver. The API or driver parses the shader code, validates the various passes in the various techniques, compiles the shader code according to those passes, yielding a shader program, and the GPU then executes the various shading programs encapsulated by the effect.

It is further realized herein the role of techniques and passes can be expanded. Rather than a pass being the atomic level of shading procedures, it is realized herein, a pass can describe how various pieces of shader code should be assembled during compilation. Passes can define pass-states that provide a mechanism to link many shader code modules together to form a specialized shader program. These pass-states can also define additional states that feedback directions to the main application, to instruct the main application to carry out some procedure. It is also realized herein that a higher-level, or "parent," effect defining a higher-level pass can override the behavior of lower-level passes defined in lower-level, or "child," effects. For example, a higher-level pass may operate on a scene, while a lower-level pass may operate on a material. When the higher-level pass overrides the lower-level pass, it results in a specialized shader program that operates on the material, at a lower-level, but according to the higher-level pass of the higher-level technique. Similarly, it is realized herein, allowing a child pass to inherit a parent pass reduces the replication of shader code modules. Likewise, techniques can reference other techniques.

It is also realized herein that an effect can include resource definitions. Resources include textures, render targets, shared memory and buffers, among others. It is realized herein that resource definitions can specify how resources are to be used as targets for rendering, and the passes of the techniques define when to use those targets. Furthermore, the passes can use the resources as inputs for the shader programs. For example, an effect could define a texture resource and a pass. The effect could also include sampler states and various shader code modules. The pass would then specify how the shader code modules should be assembled and compiled, and set the texture resource as an input to a sampler to apply a texture to an object.

It is realized herein, as an alternative to executing shader code directly from the effect container, modules of shader code can be pre-compiled as binary files of pre-compiled shader programs that can be invoked at run time and sent to a graphics driver for execution.

It is further realized that in certain embodiments, the effect containers themselves are fragmented into pre-compiled shader programs that are linked to the application, and the effect code is translated as C++ code and embedded into the application code. The advantage of this arrangement is that the effects themselves cannot be extracted from the compiled shader programs and compiled application.

Before describing various embodiments of the effect data structure or method of use introduced herein, a computing system within which various aspects of the invention may be embodied or carried out will be described.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a GPU driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the effect data structure or method of use may be embodied or carried out, various embodiments of the effect data structure and method of use will be described.

Figure 2:
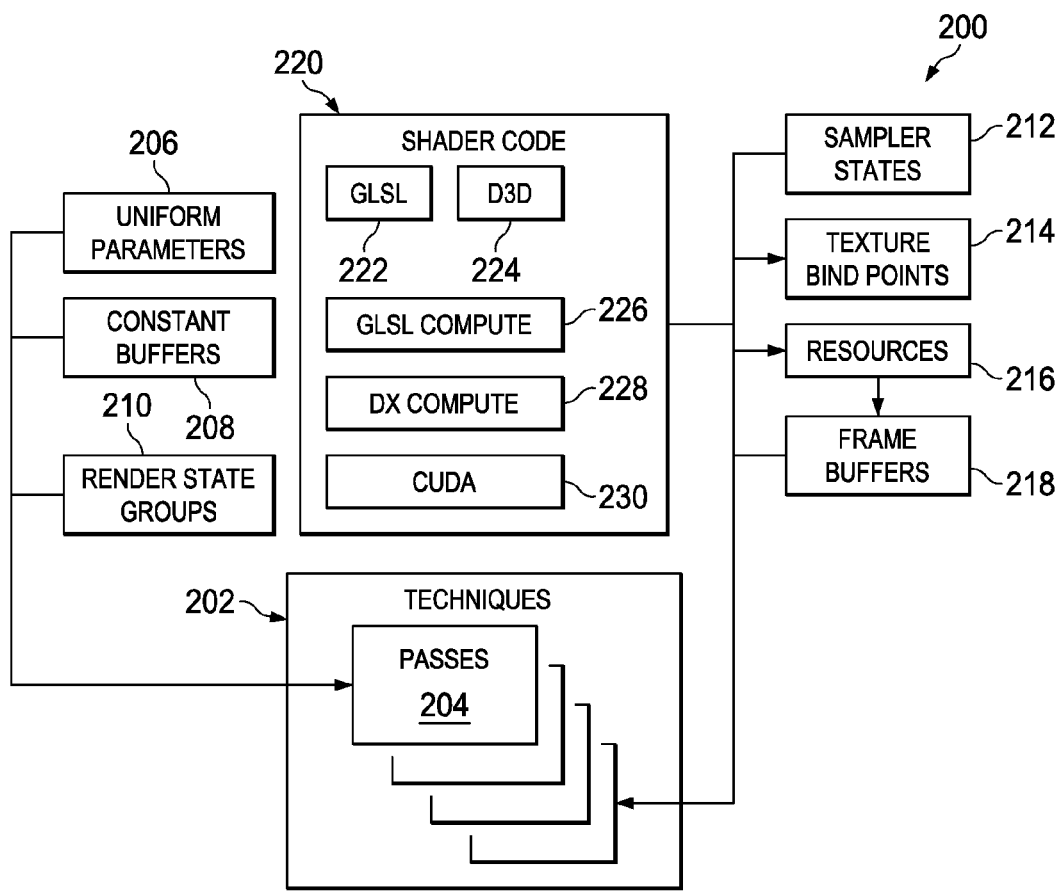
FIG. 2 is a block diagram of one embodiment of an effect data structure.

FIG. 2 is a block diagram of one embodiment of an effect data structure 200. Effect data structure 200 includes techniques 202 that each employ one or more passes 204. Effect data structure 200 also includes uniform parameters 206, constant buffers, 208, render state groups 210, sampler states 212, texture bind points 214, resources definitions 216, frame buffer definitions 218 and shader code modules 220. Passes 204, of techniques 202, use the various other elements of effect data structure 200 to define just how the intended graphics effect should be set up.

Shader code modules 220 implement shader functionality. An effect can contain many shader code modules, each containing pieces of individual shaders. The implementation can be made in one or more programming or "compute" language, or shader language. For instance, shader code 220 includes a GLSL implementation 222, a D3D implementation 224, a GLSL-compute implementation 226, a DX-compute implementation 228 and a CUDA implementation 230. In other embodiments, the effect can contain shader code modules implemented in any number of languages.

Uniform parameters 206 are variables used in rendering the effect. The uniform qualifier indicates the variables hold their value throughout the rendering process carried out by the GPU, and can be set up by a source external to the effect or through value assignment from a pass. Constant buffers 208 provide a mechanism to aggregate uniform parameters and are often convenient for efficient updating and optimizing read access in the GPU.

States are used to setup the rendering pipeline. They can be used to alter the way things are rendered. Generally, they specify which functions should be carried out. Render states control the rendering pipeline. These can be grouped together, such as in render state groups 210. Sampler states 212 control the setup of texture samplers used in shaders. Texture bind points 214 allow the application to associate texture resource to the effect such that they will be available during shader execution.

Resources 216 are GPU memory allocations defined in effect data structure 200. This allows the effect to define how certain textures, render buffers, vertex buffers, or frame buffers 218 should be created. Effect data structure 200 can also define how these resources can be used as targets, and possibly how these resources are bound to targets or textures. Frame buffers 218 define how resources can be used as targets for rendering. Frame buffers 218 can also provide for combined resources, such as a depth buffer combined with one or more color buffers. The passes of techniques can define when to use a given frame buffer as a target, and can define how to use resources as inputs to shaders. For example, a pass can define how a texture is to be used with a sampler to apply a texture to an object.

Figure 3:
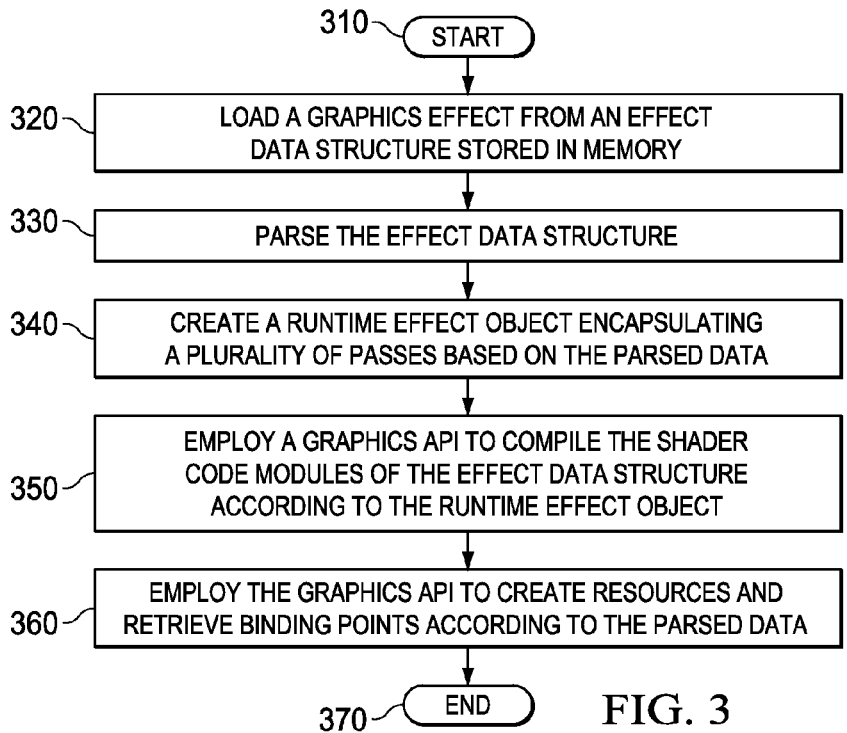
FIG. 3 is a flow diagram of one embodiment of a method of generating a shader program.

FIG. 3 is a flow diagram of one embodiment of a method for generating a shader program. The method begins in a start step 310. In loading step 320, a graphics effect is loaded from an effect data structure stored in memory. Often, this data structure is represented as an effect file. The file would contain the necessary data to populate the effect data structure. This data may include: uniform parameters, constant buffers (which can contain many uniform parameters), sampler states, state groups, resources, techniques, passes and shader code modules. Techniques can contain many passes, and passes can contain many pass-states. Pass-states can set values to uniforms, concatenate shaders, set render-states, select state groups for use, select resources for use, select sampler-states to use the resources and select render-targets. State groups can include render-states, sampler-states and other state groups. Sampler-states specify how a sampler should fetch a texture.

In the embodiment of FIG. 3, in a parsing step 330, the contents of the effect data structure are parsed. In certain embodiments, the shader code modules of the effect data structure are not parsed by the effect parser. In some embodiments, uniform parameters are used within the shader code modules, in which case they would also not be parsed. In certain embodiments, uniform parameters are extracted from the shader code modules and included in the parsed portions of the effect data structure. Binding points are then created to associate the uniform parameters to the appropriate variables in the shader code modules. This allows the effect runtime to use the uniform parameters, which are implicitly concatenated into the shader code modules by an effect runtime object.

From the parsed data, the runtime effect object is created in an instantiation step 340. The runtime effect object encapsulates the passes and techniques of the graphics effect. The passes, grouped into the techniques, specify how the various shader code modules should be assembled. The effect data structure can include multiple techniques, each having multiple passes. Each pass allows the assembly of multiple shader code modules to encapsulate a desired shading procedure, thus providing great flexibility in building a shading program. In a compilation step 350, the shader code modules, or shader code, is compiled via the appropriate graphics API or a graphics driver according to the, yielding a shader program, which can be executed by a processor, such as a GPU, or in certain embodiments, a CPU. Furthermore, at a step 360, the graphics API is employed to create resources according to the parsed data, and to retrieve binding points for the shader program. The method then ends in a step 370.

Compilation of the shader code can be carried out at various times. In certain embodiments, the compilation occurs at runtime, or more precisely, at initialization. During initialization, passes are validated, at which time the shaders are put together, compiled and sent to the GPU or CPU. In alternate embodiments, the compilation occurs before runtime, which is to say the shader code is pre-compiled.

Figure 4:
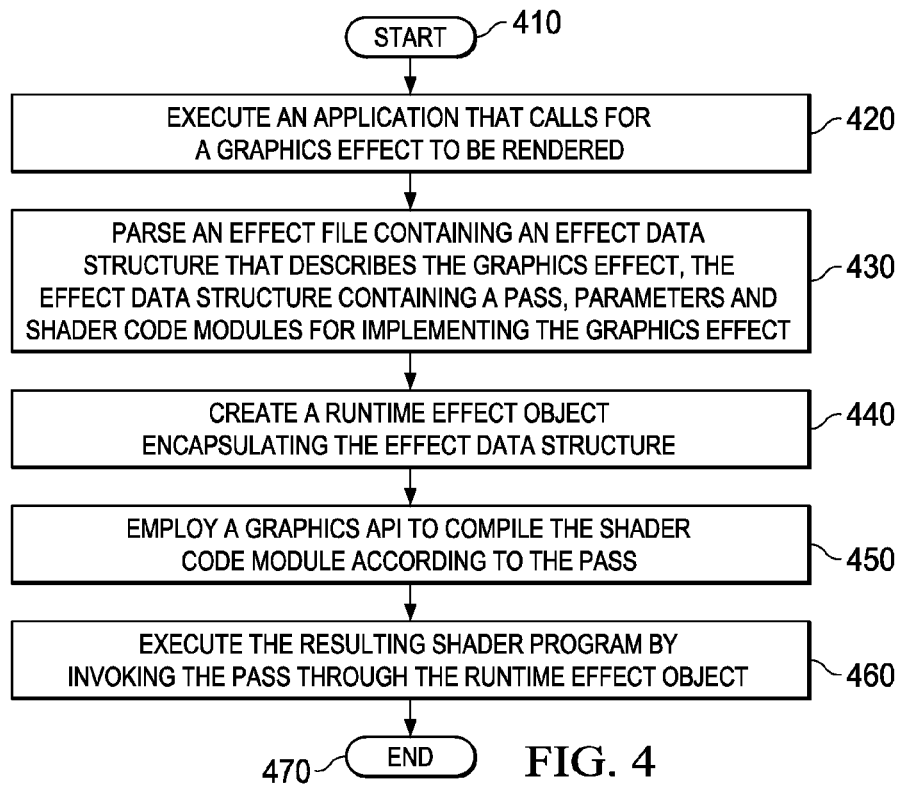
FIG. 4 is a flow diagram of one embodiment of a method of rendering a graphics effect.

FIG. 4 is a flow diagram of one embodiment of a method for rendering a graphics effect on an object in a scene. The method begins in a start step 410. In an execution step 420, an application that calls for the graphic effect to be rendered is executed. This execution, in certain embodiments, is carried out on a CPU. In a parsing step 430, an effect file describing the graphics effect called for by the application is parsed. The effect file contains an effect data structure that describes the effect, and typically contains at least a pass, parameters and shader code modules for implementing the graphics effect. It is not necessary to include a pass in the effect, however, without a pass, there is no entry point for the application to invoke the shaders encapsulated within. The effect may have many passes grouped into one or more techniques. Additionally, the effect data structure can also contain samplers, states, other techniques, resource allocations, and possibly alternate implementations of the shader code. In certain embodiments, the effect data structure may contain implementations of the same shader code modules in multiple shading languages to support various operating systems, graphics hardware and graphics APIs. Resources definitions can be used to specify render targets, or to setup various I/O resources to be used by the shaders.

In a creation step 440, a runtime effect object is created that encapsulates the effect data structure. The shader code is then compiled according to the structure of the passes within the techniques via a graphics API or driver in a compilation step 450. During compilation, the various resources defined by the effect are setup, as well as any uniform parameters, and to setup various render states in the GPU. The pass and compiled shader code is then executed in an execution step 460 according to the runtime effect object, which is employed by the application executing in execution step 420. Execution is carried out by invoking the pass through the runtime effect object, which then sends the shader program to the GPU for execution. The method then ends in a step 470.

Those skilled in the art to which this application relates will appreciate that other and further additions, deletions, substitutions and modifications may be made to the described embodiments.

What is claimed is:

1. An effect processing system, comprising:
a memory configured to store an effect data structure that describes a graphics effect implemented by a plurality of passes and shader code modules contained in said effect data structure, wherein said effect data structure further includes additional elements and said shader code modules include different shader languages;
a graphics processing unit (GPU) operable to render said graphics effect according to a shader program based on said shader code modules and said additional elements, assembled according to said plurality of passes; and
a central processing unit (CPU) configured to execute an application that employs said graphics effect and to gain access to said effect data structure during run time, at which time said shader code modules are not parsed and are passed to said GPU for processing, wherein said additional elements include uniform parameters, constant buffers, render state groups, sampler states, texture bind points, and frame buffer definitions.

2. The effect processing system recited in claim 1 wherein said CPU treats said shader code modules as data.

3. The effect processing system recited in claim 2 wherein said shader code modules include OpenGL Shading Language (GLSL) code.

4. The effect processing system recited in claim 2 wherein said CPU is further configured to parse said effect data structure.

5. The effect processing system recited in claim 4 further comprising an application programming interface (API) by which said shader code modules are parsed and through which said shader program is passed to said GPU.

6. The effect processing system recited in claim 1 wherein said effect data structure includes a plurality of techniques respectively containing said plurality of passes.

7. The effect processing system recited in claim 6 wherein said effect data structure includes resource definitions.

8. A method of generating a shader program, comprising:
loading a graphics effect from an effect data structure stored in memory, said effect data structure having shader code modules of different shader languages, and additional elements including uniform parameters, constant buffers, render state groups, sampler states, texture bind points, resource definitions, and frame buffer definitions;

parsing said effect data structure, wherein said parsing excludes parsing said shader code modules of said effect data structure;

creating a runtime effect object encapsulating a plurality of passes based on parsed data from said parsing, wherein said plurality of passes employ said additional elements to define implementation of said graphics effect; and employing a graphics application programming interface (API) in compiling said shader code modules of said effect data structure according to said runtime effect object, thereby generating said shader program.

9. The method recited in claim 8 wherein said effect data structure is decoupled from a single shader language.

10. The method recited in claim 8 wherein said effect data structure includes a technique that assembles at least one of said plurality of passes.

11. The method recited in claim 8 wherein said employing includes compiling said shader code modules at runtime.

12. The method recited in claim 8 further comprising employing said graphics API to create resources and retrieve binding points.

13. The method recited in claim 8 wherein said parsing said effect data structure includes parsing uniforms extracted from said shader code modules, and said runtime effect object includes binding points for said uniforms in said shader code modules.

14. The method recited in claim 8 wherein said different shader code languages include OpenGL Shading Language (GLSL) code, compute unified device architecture (CUDA), GLSL-Compute, high-level shading language (HLSL) and D3D.

15. A method of rendering a graphics effect on an object in a scene, comprising:

executing an application that calls for said graphics effect to be rendered;

parsing an effect file containing an effect data structure that describes said graphics effect, said effect data structure containing a pass, constant buffers, render state groups, sampler states, texture bind points, resource definitions, frame buffer definitions, uniform parameters and shader code modules of different shader languages for implementing said graphics effect, wherein said parsing excludes parsing said shader code modules;

creating a runtime effect object encapsulating said effect data structure;

employing a graphics application programming interface (API) to compile said shader code modules according to said pass, thereby generating a shader program, wherein said pass describes assembling of said shader code modules to form said shader program; and executing said shader program by invoking said pass through said runtime effect object, thereby rendering said graphics effect.

16. The method recited in claim 15 wherein said different shader code languages include OpenGL Shading Language (GLSL) code, compute unified device architecture (CUDA), GLSL-Compute, high-level shading language (HLSL), D3D, and DX-compute.

17. The method recited in claim 15 wherein said pass is one of a plurality of passes in a technique.

18. The method recited in claim 15 wherein said parsing excludes parsing said shader code.

19. The method recited in claim 15 wherein said employing is carried out before runtime.

20. The method recited in claim 15 wherein said effect data structure is implemented in extensible markup language (XML).

* * * * *